US011790909B2

(12) United States Patent
Sampath et al.

(10) Patent No.: US 11,790,909 B2
(45) Date of Patent: Oct. 17, 2023

(54) SYSTEM AND METHOD FOR SMART VALIDATION OF PRE-CONDITIONS IN EXECUTING PILOT VOICE COMMANDS

(71) Applicant: HONEYWELL INTERNATIONAL INC., Charlotte, NC (US)

(72) Inventors: Mahesh Kumar Sampath, Madurai (IN); Vasantha Selvi Paulraj, Madurai (IN); Chaya Garg, Plymouth, MN (US); Anil Kumar Songa, Bangalore (IN); Ravi Tupakula, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 286 days.

(21) Appl. No.: 17/176,512

(22) Filed: Feb. 16, 2021

(65) Prior Publication Data
US 2022/0084514 A1  Mar. 17, 2022

(30) Foreign Application Priority Data

Sep. 16, 2020  (IN) .............................. 202011040095

(51) Int. Cl.
*G06F 3/16* (2006.01)
*G06F 16/24* (2019.01)
(Continued)

(52) U.S. Cl.
CPC ............ *G10L 15/22* (2013.01); *G05D 1/0016* (2013.01); *G05D 1/101* (2013.01); *G06F 3/167* (2013.01);
(Continued)

(58) Field of Classification Search
USPC ................. 704/1–275; 706/1–62, 900–934
See application file for complete search history.

(56) References Cited

U.S. PATENT DOCUMENTS 8,515,763 B2 * 8/2013 Dong .................. G10L 21/0208
701/14
10,684,756 B2   6/2020 Helppi et al.
(Continued)

FOREIGN PATENT DOCUMENTS

EP        3079137 A2    10/2016

OTHER PUBLICATIONS

WO-0225214/Qureshi Hisham M; Graphical System and Method for Defining Pilot Tasks, Patterns and Constraint, Mar. 28, 2002 (Year: 2002).*

(Continued)

*Primary Examiner* — Marcellus J Augustin
(74) *Attorney, Agent, or Firm* — Lorenz & Kopf LLP

(57) ABSTRACT

Methods and systems are provided for validation of speech commands from an aircraft pilot. The method comprises receiving a speech command from the aircraft pilot with a voice communication device that is part of a cockpit system. Next, the speech command is decoded into a computer readable format. The decoded speech command is then checked against the present aircraft state as indicated by avionic sensors of the aircraft and against an approved pre-condition that is stored in a pre-condition database. The decoded speech command is validated if the decoded speech command is consistent with the present aircraft state and consistent with the approved pre-condition. An input to the cockpit system is updated to execute the speech command from the aircraft pilot if the decoded speech command is validated.

1 Claim, 3 Drawing Sheets

(51) Int. Cl.
  *G05D 1/00* (2006.01)
  *G10L 15/22* (2006.01)
  *G06F 16/245* (2019.01)
  *G05D 1/10* (2006.01)

(52) U.S. Cl.
  CPC ...... *G06F 16/245* (2019.01); *G10L 2015/223* (2013.01); *G10L 2015/228* (2013.01)

(56) References Cited

U.S. PATENT DOCUMENTS

| | | | | |
|---|---|---|---|---|
| 2010/0030400 | A1* | 2/2010 | Komer | G08G 5/0021 704/251 |
| 2015/0100311 | A1* | 4/2015 | Kar | G08G 5/0013 704/231 |
| 2018/0182250 | A1* | 6/2018 | Bonnet | G08G 5/0013 |
| 2021/0366292 | A1* | 11/2021 | Braaten | G08G 5/0013 |

OTHER PUBLICATIONS

FR3056321; Cotdeloup Fabrice, Method and Device for Identifying an Aircraft to an Audio Communication; Mar. 23, 2018 (Year: 2018).*

EP2902991; McCullough Sue; Systems And Methods For Utilizing Voice Commands Onboard An Aircraft, Aug. 5, 2015 (Year: 2015).*

* cited by examiner

SYSTEM AND METHOD FOR SMART VALIDATION OF PRE-CONDITIONS IN EXECUTING PILOT VOICE COMMANDS

CROSS-REFERENCE TO RELATED APPLICATION(S)

This application claims priority from Indian Provisional Application No. 202011040095, titled "System and Method for Smart Validation of Pre-Conditions in Executing Pilot Voice Commands" that was filed Sep. 16, 2020.

TECHNICAL FIELD

The present invention generally relates to automated aircraft operations, and more particularly relates to validation and executing pilot voice commands.

BACKGROUND

A cockpit display system of an aircraft supports selection and viewing of various information such as flight path information, navigational aids (NAVAID), airspace information, terrain information, weather information, traffic information, and the like. These various information layers are logically grouped under different high-level menus to provide a unified graphical display on the avionics display system for the pilot selection to provide better situational awareness.

Speech modality allows direct access of menu items and actions of a cockpit display system by a pilot. It also does not require the pilot to follow traditional navigational sequences that traditional modalities such as required by a cursor or touch screen. This reduces the navigational steps but required but also does not provide any cue to the pilot if a command is appropriate/available given the current state of the system and avionics. Hence, there is a need for a system and method for smart validation of pre-conditions in executing pilot voice commands.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for validation of speech commands from an aircraft pilot. The method comprises: receiving a speech command from the aircraft pilot with a voice communication device, where the voice communication device is part of a cockpit system; decoding the speech command into a computer readable format; checking the decoded speech command against the present aircraft state as indicated by avionic sensors of the aircraft; checking the decoded speech command against an approved pre-condition that is stored in a pre-condition database; validating the decoded speech command if the decoded speech command is consistent with the present aircraft state; validating the decoded speech command if the decoded speech command is consistent with the approved pre-condition; and updating an input to the cockpit system to execute the speech command from the aircraft pilot if the decoded speech command is validated.

A system is provided for validation of speech commands from an aircraft pilot. The system comprises: a voice communication device that receives a speech command from the aircraft pilot; and a flight management system (FMS) that, decodes the speech command into a computer readable format, checks the decoded speech command against the present aircraft state as indicated by avionic sensors of the aircraft, checks the decoded speech command against an approved pre-condition that is stored in a pre-condition database, validates the decoded speech command if the decoded speech command is consistent with the present aircraft state, validates the decoded speech command if the decoded speech command is consistent with the approved pre-condition, and updates an input to the cockpit system to execute the speech command from the aircraft pilot if the decoded speech command is validated.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method for validation of speech commands from an aircraft pilot has been developed. The method comprises receiving a speech command from the aircraft pilot with a voice communication device that is part of a cockpit display system. Next, the speech command decoded into a computer readable format. The decoded speech command is checked against the present aircraft state as indicated by avionic sensors of the aircraft and checked against an approved pre-condition that is stored in a pre-condition database. The decoded speech command is validated if the decoded speech command is consistent with the present aircraft state and with an approved pre-condition. In one example, a validated decoded speech command is used as an update to a flight management system (FMS) onboard the aircraft to execute the speech command from the aircraft pilot. In other embodiments, any cockpit system with an interface to receive a decoded speech command may be used.

Figure 1:
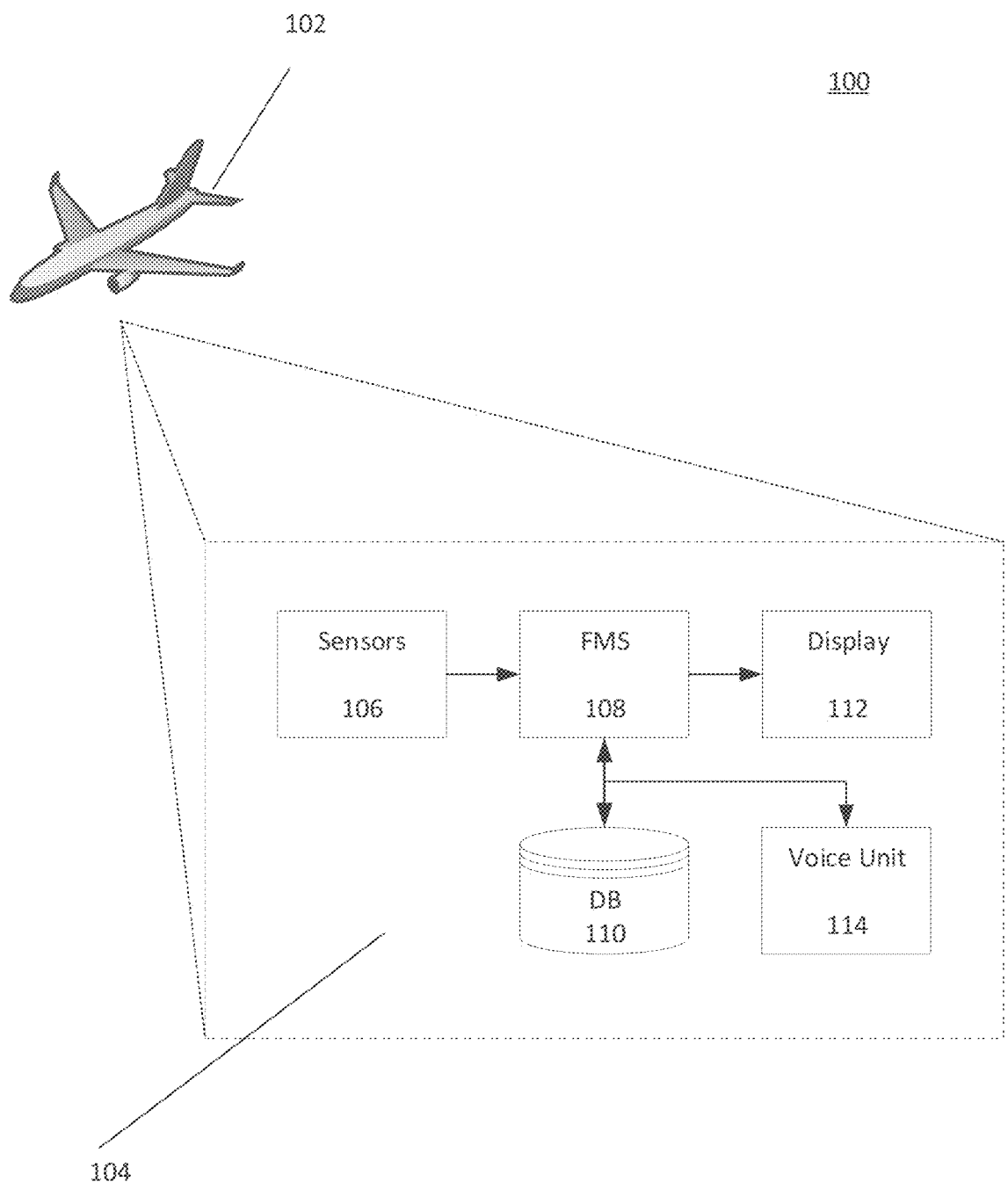
FIG. 1 shows a diagram of an in-flight aircraft with a cockpit display system in accordance with one embodiment.

Turning now to FIG. 1, a diagram 100 is shown of an in-flight aircraft 102 with a cockpit display system 104 that contains aircraft data sensors 106, an onboard FMS 108 along with a database 110 that is accessed by the FMS 108 in accordance with one embodiment. The FMS controls a visual display unit 112 located in the cockpit. The display unit 112 also receives input from a voice control unit 114 that is control by the aircrew of the aircraft 102. In alternative embodiments, the database 110 may be integrated as part of the FMS 108. In still other embodiments, the database 110 may be located off board the aircraft on the ground and connected to the FMS 108 via a communications data link. In some embodiments, the database 110 may include an aircraft pre-condition database as well as a performance characteristics database of the aircraft 102 for retrieval and use by the FMS 108.

The FMS, as is generally known, is a specialized computer that automates a variety of in-flight tasks such as in-flight management of the flight plan. Using various sensors such as global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigation database. The navigation database contains elements used for constructing a flight plan. In some embodiments, the navigation database may be separate from the FMS and located onboard the aircraft while in other embodiments the navigation database may be located on the ground and relevant data provided to the FMS via a communications link with a ground station. The navigation database used by the FMS may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the plight flight plan before takeoff or even while in flight for variety of reasons. Such changes may be entered via the CDU. Once in flight, the principal task of the FMS is to accurately monitor the aircraft's position. This may use a GPS, a VHF omnidirectional range (VOR) system, or other similar sensor in order to determine and validate the aircraft's exact position. The FMS constantly cross checks among various sensors to determine the aircraft's position with accuracy.

Additionally, the FMS may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS has detailed flight and engine model data of the aircraft. Using this information, the FMS may build a predicted vertical descent path for the aircraft. A correct and accurate implementation of VNAV has significant advantages in fuel savings and on-time efficiency.

Figure 2:
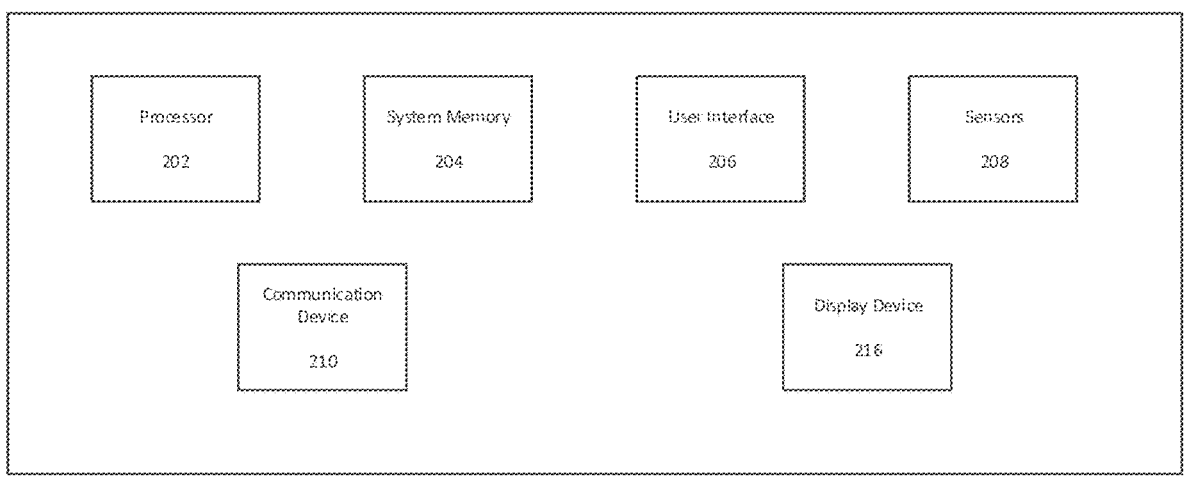
FIG. 2 shows a functional block diagram of a computing device in accordance with one embodiment.

FIG. 2 is a functional block diagram of a computing device 200, in accordance with the disclosed embodiments. It should be noted that the computing device 200 can be implemented with the cockpit display system 104 depicted in FIG. 1. In this regard, the computing device 200 shows certain elements and components of the cockpit display system 104 in more detail.

The computing device 200 generally includes, without limitation: a processor 202; system memory 204; a user interface 206; a plurality of sensors 208; a voice communication device 210; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The voice communication device 210 is suitably configured to communicate pilot commands to the processor 202 and one or more avionics systems onboard an aircraft. The voice communication device 210 will infer and provide appropriate context for spoken commands and aims to reduce pilot workload in using voice commands. For a valid speech command, the pre-conditions associated with executing that speech commands by the aircraft are also validated and executed by the system 200, thus reducing pilot workload.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
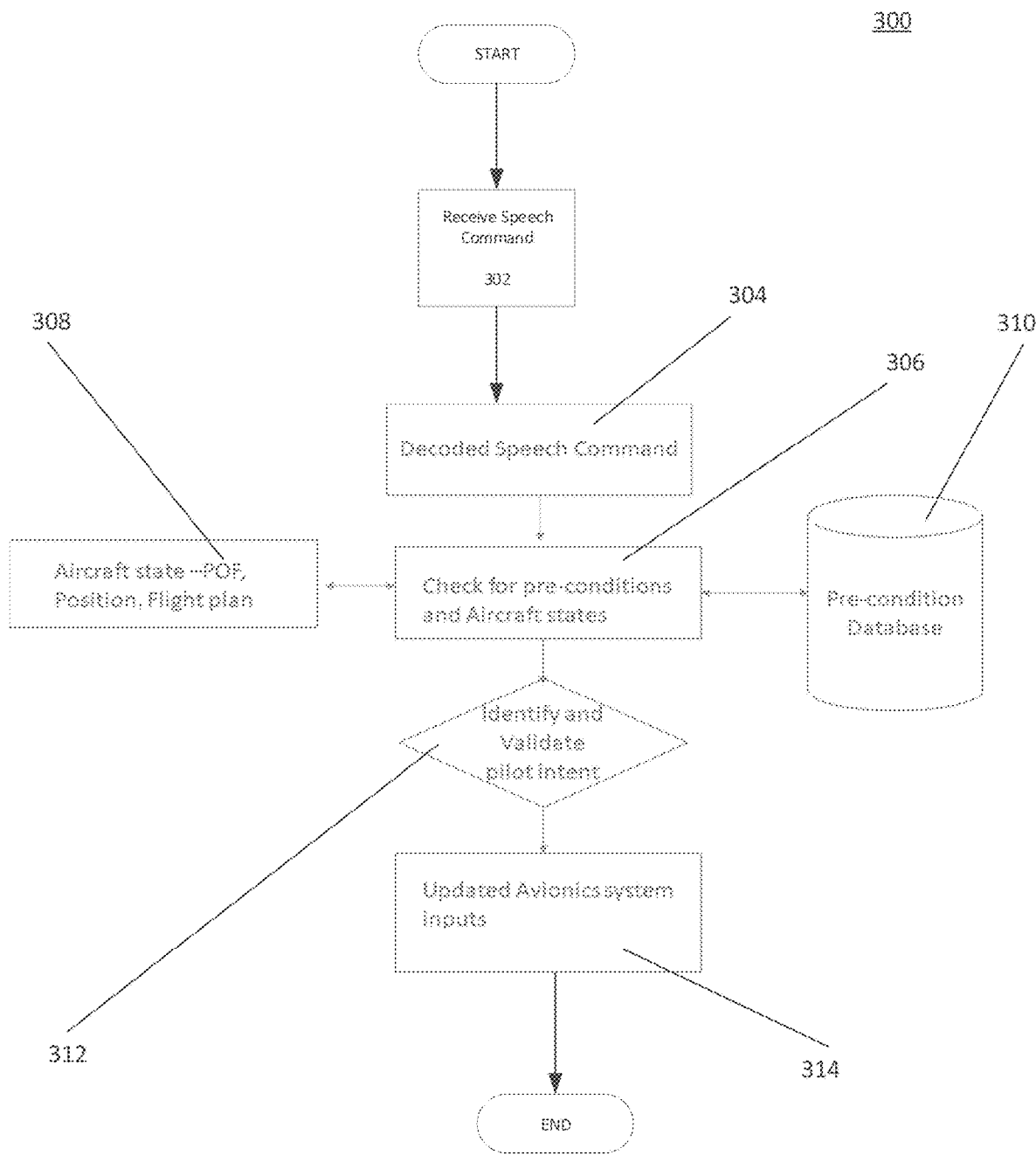
FIG. 3 shows a flowchart of a method for validation of speech commands from an aircraft pilot in accordance with one embodiment.

Turning now to FIG. 3, a flowchart 300 is shown of a method for validation of speech commands from an aircraft pilot. The method comprises receiving a speech command from the aircraft pilot with a voice communication device that is part of a cockpit display system 302. Next, the speech command decoded into a computer readable format 304. The decoded speech command is checked against the present aircraft state 306 as indicated by avionic sensors of the aircraft 308 and checked against an approved pre-condition 306 that is stored in a pre-condition database 310. The decoded speech command is validated if the decoded speech command is consistent with the present aircraft state and with an approved pre-condition 312. A validated decoded speech command is used as an update to a flight management system (FMS) onboard the aircraft to execute the speech command from the aircraft pilot 314.

Some embodiments have advantages of helping reduce pilot workload and improve operational efficiency. A system will infer and provide appropriate context for spoken commands and aim to reduce pilot workload in using voice commands. In voice activated communication device, pre-conditions associated with executing that valid speech commands are validated along with the current state of the aircraft. If the voice command is determined to be valid, the targeted end command is executed, thus reducing pilot workload.

Speech recognized commands are not meant to replace the cursor control displays (CCD) or touchscreen (TSC) of the display system. However, some commands may be tailored to help the crew in being more efficient when performing tasks (e.g., radio tuning, INAV layer selection, and Chart search) that are normally performed with CCD or TSC. So representative examples are explained below for each of the application.

INAV/MAP Layer Selection

A pilot may control what is viewed on a navigation display (ND) by entering a range setting into a range selector. The range setting is applied to all information layers displayed on the navigation display. Typically, the layer selection is done through CCD cursor and range selection is done using range knobs. So the pilot needs to select the optimum range for each of the layer selection task when interacting with CCD/Touch.

With speech command validation of enabling layer information, optimum range selection can be done based on the efficient de-clutter logic suitable for the layer. For example, different information layers are grouped in the interactive navigation (INAV) map which is the interactive graphical map of the avionics system.

The INAV map displays various sets of database information (geographic features, airways, NAVAIDs, airports, vertical profile, and communication) and merges information coming from the onboard sensors to provide an intuitive and synthetic picture of the aircraft situational environment. INAV permits the crew to enable/disable any information on the map with the joystick controller or CCD. Typically, the information are grouped under the active layers control bar consisting of multiple soft buttons. Pushing an active layers control displays a dropdown menu and subsequent pilot selection happens based on the pilot needs for the required situational awareness.

For example, airport display layers may be enabled by selecting an "AIRPORTS" checkbox in a drop down menu. These airports are not displayed when the range is greater than 150 NM. So, after enabling the Airports layers, pilots need to reduce the range below 150 NM with the CCD to view the airports. With one embodiment of speech command validation, when an AIRPORT layer voice commands is spoken, the range is selected at 150 NM to let pilot view the airport layer without additional workload.

Radio Tuning

In an aircraft, an audio panel is used the select the communication (COM) radio to transmit audio for the pilot to communicate with an air traffic controller (ATC) to request/acknowledge clearances. Selecting and tuning a radio involves: selecting the particular COM/NAV using cursor from CCD or select COM button on a multifunction controller (MFC); entering the frequency using numeric keypad on the MFC and using a SELECT knob on the primary flight display (PFD) Controller; and activating the tuned standby frequency by using SWAP button on the MFC/PFDC or by pressing the radio icon on PFD.

In one embodiment, the pilot says only frequency without any target radio, the system can determine and route the frequency to the appropriate radio in standby for pilot confirmation. For example, if the voice command is to tune to a tower controller (e.g., TUNE KPHX TOWER), then the system can determine target radio to tune this frequency. In another example, if the voice command is to tune and listen, then the command can be routed to a non-microphone selected radio, since only reception and no transmission is required.

In another example, a target radio can be selected based on the principles of flight (POF). If the aircraft is in departure phase of flight and the voice commanded frequency is 118.975 without a COM target identified, then the system determines the radio target as COM2 which is currently tuned to Taxi Clearance frequency. The system determines it can be changed based on POF and decides to update it to the next ATC frequency (e.g., the departure controller frequency).

Charts

Based on phase of flight, the voice command can be routed to open charts. For example, if the POF is taxiing for takeoff, then an "OPEN CHARTS" voice command can open the origination taxi charts, which reduce the pilot workload. If the POF is on approach, then the "OPEN CHARTS voice command can open the charts of approach programmed in flight plan.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for validation of speech commands from an aircraft pilot, comprising:
   a voice communication device that receives a speech command from the aircraft pilot; and
   a flight management system (FMS) that,
      decodes the speech command into a computer readable format,
      checks the decoded speech command against the present aircraft state as indicated by avionic sensors of the aircraft,
      checks the decoded speech command against an approved pre-condition that is stored in a pre-condition database,
      validates the decoded speech command if the decoded speech command is consistent with the present aircraft state,
      validates the decoded speech command if the decoded speech command is consistent with the approved pre-condition, and
      updates an input to the cockpit system to execute the speech command from the aircraft pilot if the decoded speech command is validated.

* * * * *